United States Patent [19]

Gibbs

[11] Patent Number: 5,454,499
[45] Date of Patent: Oct. 3, 1995

[54] VEHICLE RACK HAVING WING WITH SPECIAL JOINT

[75] Inventor: Douglas P. Gibbs, Yuba City, Calif.

[73] Assignee: Mascotech Accessories, Inc., Sacramento, Calif.

[21] Appl. No.: 143,289

[22] Filed: Oct. 26, 1993

[51] Int. Cl.[6] .................................................. B60R 9/00
[52] U.S. Cl. .......................... 224/324; 224/309; 224/325
[58] Field of Search ................................. 224/324, 319, 224/309, 315, 323, 325, 329, 330, 331, 282, 42.03 B, 320

[56] References Cited

U.S. PATENT DOCUMENTS

| | | | |
|---|---|---|---|
| 3,719,297 | 3/1973 | Nowicki | 224/324 |
| 3,848,785 | 11/1974 | Bott | 224/324 |
| 3,957,301 | 5/1976 | Huber | 224/320 |
| 5,137,195 | 8/1992 | Walter | 224/324 |

Primary Examiner—Henry J. Recla
Assistant Examiner—David J. Walczak
Attorney, Agent, or Firm—Flehr, Hohbach, Test, Albritton & Herbert

[57] ABSTRACT

An automotive vehicle rack is described having a wing joint which holds the wing open, i.e., away from its associated cross bar, to facilitate loading/unloading of skis or other elongated articles. An obstruction is included as part of the joint, which obstruction is configured and positioned to hinder the pivoting selectively and hold the wing away from its closed position.

14 Claims, 2 Drawing Sheets

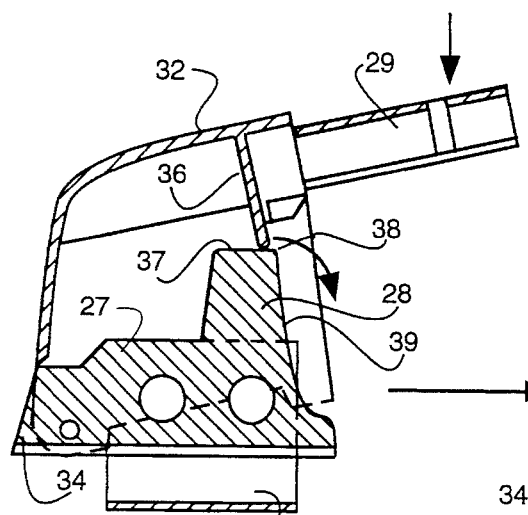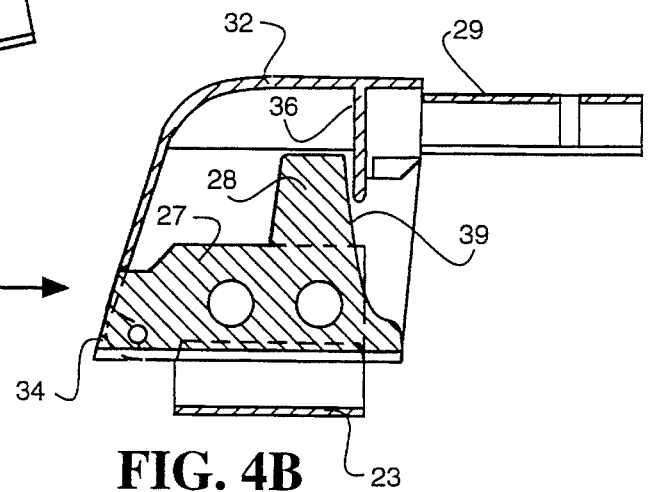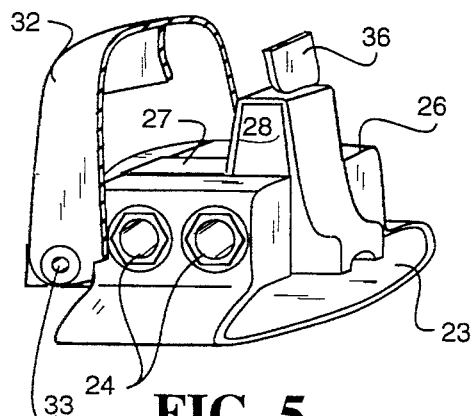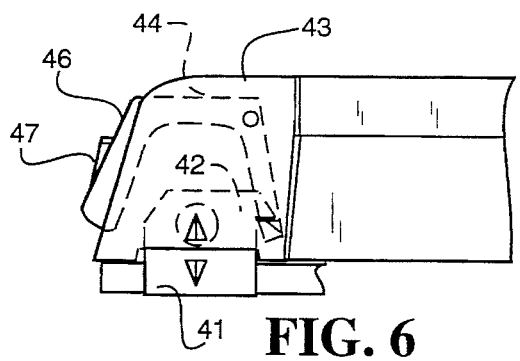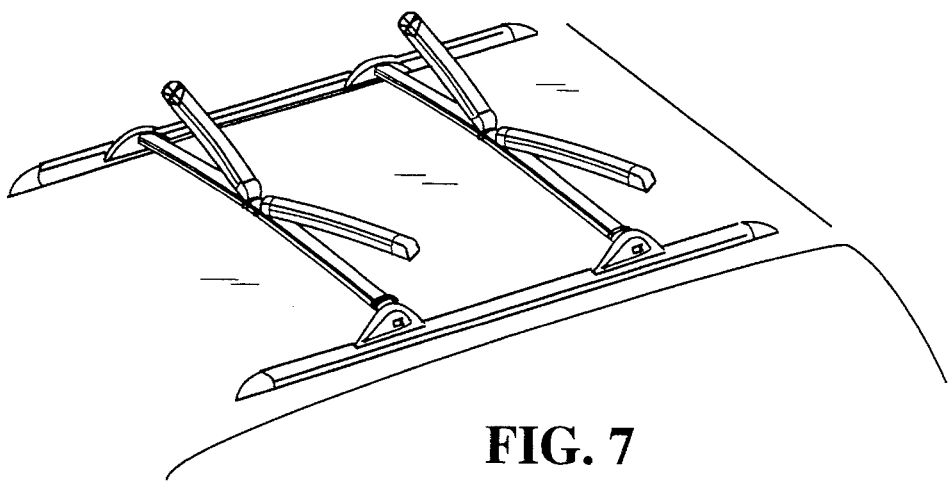

VEHICLE RACK HAVING WING WITH SPECIAL JOINT

BACKGROUND OF THE INVENTION

The present invention relates to automotive vehicle racks and, more particularly, to a joint for pivoting a wing relative to a rack bar.

Wings are provided on automotive vehicle racks, or for use with the same, to facilitate the carrying of elongated sporting articles, such as skis. That is, spaced-apart wings are securable to rack cross bars to pivot away from the bar to allow the ski to be placed on the bar. The wings are then brought to a closed position relative to the bar to capture the ski and to facilitate its transportation.

There is a problem associated with the use of most racks having wings. The wings typically will not remain in an open position without holding, i.e., away from the closed position relative to the rack bar with which the wing cooperates. In this connection, most wings are raised to facilitate loading and/or unloading, and it is difficult for a user to both hold a wing open and manipulate the skis or other articles to be secured for transportation.

SUMMARY OF THE INVENTION

The present invention is a wing joint which addresses the above problem. In its basic aspects, the wing joint includes, as is typical, means for rigidly securing the same to a rack bar, such as a cross bar on an automotive vehicle roof panel. It also includes means for pivoting a wing to a closed position relative to the bar. In keeping with the invention, it further includes an obstruction configured and positioned to hinder the pivoting and hold the wing away from the closed position when desired. This obstruction preferably is designed to itself be out of the way and provide accessible space between the wing and the bar. Thus, one loading skis or the like on the rack need not maintain The wing in a raised position at the same time he/she is loading, unloading skis or other sporting articles. While the obstruction hinders wing pivoting and holds it, it is configured and positioned to allow the pivoting of The wing when a little force is applied to the wing so that it is used, in essence, as a lever for the joint. That is, the obstruction is designed to selectively hinder the pivoting.

As mentioned previously, the construction is quite simple. The obstruction is rigid with respect to the rack bar and is positioned to be engaged by a stop tab associated with the pivoting means to cooperate in providing the desired action. The stop tab is positioned to engage an edge of the face of the obstruction along which the tab later slides when the wing is pivoted beyond the stop position toward its closed position. Most desirably, the edge is curved or otherwise shaped to facilitate the sliding.

Other features and advantages of the invention either will become apparent or will be described in connection with the following, more detailed description of preferred embodiments of the invention.

BRIEF DESCRIPTION OF THE DRAWING

With reference to the accompanying drawing:

FIGS. 4A and 4B are sectional views of the preferred embodiment respectively showing the coupler in the open and closed positions;

FIG. 5 is an isometric, broken away view illustrating the interior of the preferred embodiment of the joint;

FIG. 6 is an enlarged side and broken away view illustrating the latch for securing a rack wing to a cross bar in the preferred embodiment; and FIG. 7 is another isometric view similar to FIG. 1 showing a modification.

DETAILED DESCRIPTION OF THE PREFERRED EMBODIMENT(S)

The following relatively detailed description is provided to satisfy the patent statutes. However, it will be appreciated by those skilled in the art that various changes and modifications can be made without departing from the invention.

Figure 1:
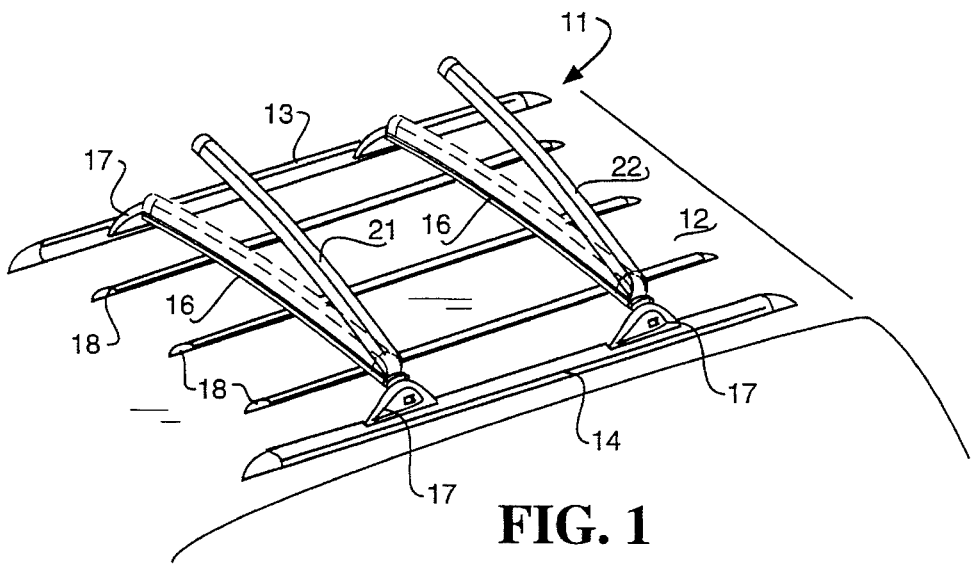
FIG. 1 is an isometric view illustrating a preferred embodiment of the invention on the roof panel of an automotive vehicle.

FIG. 1 illustrates an automotive vehicle rack, generally referred to by the reference numeral 11, mounted on the roof panel 12 of a vehicle. Such rack includes a pair of spaced apart side rails 13 and 14 which extend longitudinally of the roof and cross bars 16 which are secured between the side rails at an elevation relative to the roof bar via stanchions 17. A plurality of slats 18 are also provided adhered in this embodiment directly to the roof and extending longitudinally between the rails 13 and 14. (It will be appreciated that from the broad standpoint the side rails and the slats, as well as the cross bars 14, are rack "bars".)

Rack 11 is designed to hold skis or other elongated articles. In this connection, it includes a pair of elongated wings 21 and 22 pivotally connected at one end to respective ones of the cross bars 16 as illustrated. Each of such wings is pivotable as is common from a position in which it allows accessible space between the same and its associated bar for loading/unloading and a closed position in which it cooperates with such bar to capture ski(s) or other sporting article(s). It should be noted that such wings can be provided either as an original part of the rack or an add-on designed to cooperate with a cross bar which is part of the original rack.

Each wing joint includes means for rigidly securing the same to its associated rack bar. In this embodiment, such means is in the form of a clip 23 as illustrated which engagedly surrounds its associated cross bar, represented in FIGS. 2 and 3 by bar 16. The clip is held in position on the bar by a pair of bolts 24 which pass through registering holes in end flanges 26. The clip holds between the two end flanges, a piece 27 which will be discussed in more detail hereinafter.

Each includes a tubular elongated part, and each wing joint includes a tongue 29 which telescopes within the wing for securing the same to such joint. A bolt hole 31 registers with a corresponding bolt hole in a wing to provide fastening.

The tongue 29 is part of means for pivoting a wing which is secured to the joint to a closed position relative to its associated bar. Such means also includes a cap 32 having a pair of ears through which a pivot pin 33 secures the same to an end block 34 extending from the piece 27 having the obstruction 28.

In keeping with the invention, the wing joint by which each of the wings is pivotally connected to its associated cross bar is designed to facilitate loading/unloading. It includes a projecting abutment or, in other words, an obstruction 28 which is configured an positioned to hinder the pivoting selectively a hold its associated wing away from the closed position. FIG. 1 illustrates the wings 21 and 22 so held. Such obstruction is part of the piece 27 and thereby is held rigid with respect to the rack bar.

Figures 2, 3:
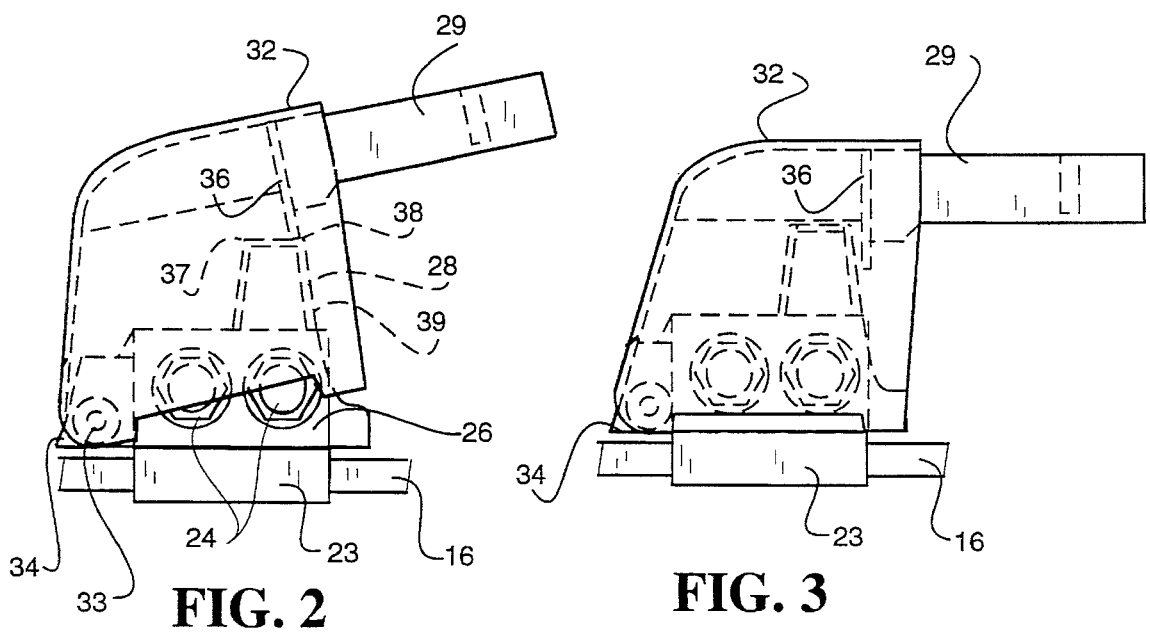
FIGS. 2 and 3 are enlarged side elevation views of the preferred embodiment, FIG. 2 showing the coupler in a wing open position and FIG. 3 showing the coupler in a wing closed position.

Cap 32 includes internally thereof, a stop tab 36 which the upper surface 37 of the obstruction 28 as illustrated in FIGS. 2 and 4A. When it is in engagement with such surface it prevents further pivoting of the wing with which it is associated toward the closed position. However, as illustrated it engages the same at an angle and adjacent an edge 38 of a face 39. When further force is applied to the wing the stop tab 36 slips beyond the edge 38 to ride on obstruction face 39 to the position illustrated in FIGS. 3 and 4B in which the wing is in a closed position relative to its associated bar. The facts that the wing provides significant pivoting leverage, the tab engages the obstruction surface 37 at an angle, and there is a curve at edge 38, all cooperate to enable the additional pivoting.

A latch is provided at the opposite end of each of the wings 21 and 22 to secure its associated wing in the closed position. While from the broad standpoint such latch can take many different forms, FIG. 6 illustrates a preferred arrangement utilizable with the construction described. It includes a clip 41 which rigidly secures a snap hook 42 in position on the rack bar. The end of the wing bar includes a cap 43 similar to the cap 32 but having pivoted inside of the same, a spring-loaded snap latch 44 which engages the hook 42. A button 46 which is integral with the snap latch 44 projects from the cap 43 to facilitate unlatching by a user. A standard key lock represented a 47 can be provided to prevent movement of the latch snap relative to the casing and thus provide security.

As alluded to at the beginning of the detailed description, applicant is not limited to the specific embodiments described above. Various changes and modifications can be made. For example, FIG. 5 shows an arrangement in which there are two wings associated with each cross bar, each of such wings having a wing joint adjacent the center of the cross bar. These joints face in opposite directions as illustrated. The claims, their equivalents end their equivalent language define the scope of protection.

What is claimed is:

1. A wing joint adapted to secure a wing to a bar of an automotive vehicle rack, comprising:
    means for rigidly securing the joint to a rack bar;
    means for pivoting said wing from an open position to a closed position relative to said bar; and
    a projecting abutment configured and positioned to hinder said pivoting selectively and thereby hold said wing away from said closed position, said pivoting means including a stop tab which is spaced from a projecting portion of said abutment when said wing is in said open position and which engages said projecting portion of said abutment and cooperates therewith to provide said hindering and holding upon pivoting of said wing from said open position to said closed position.

2. The wing joint of claim 1 wherein said abutment is configured and positioned to maintain accessible space between said wing and said bar when the same is holding said wing away from said closed position.

3. The wing joint of claim 1 wherein said stop tab is positioned to engage an edge of a face of said abutment along which said tab slides when said wing is pivoted toward said closed position.

4. The wing joint of claim 3 wherein said edge is shaped to facilitate said sliding.

5. The wing joint of claim 1 further including an elongated wing having said joint at one end thereof and a latch at its opposite end for maintaining the same in said closed position.

6. The wing joint of claim 1 further including a wing connected to said wing joint wherein said wing is configured and adapted to cooperate with said rack bar to secure skis on said automotive vehicle rack when said wing is in said closed position.

7. The wing joint of claim 1 further including a rack bar connected to said wing joint.

8. The wing joint of claim 7 wherein said rack bar is a rack cross bar having a center, and there are two of said wing joints adjacent said center facing in opposite directions relative to the same.

9. A pair of wing joints respectively adapted to secure a pair of wings respectively to spaced-apart bars of an automotive vehicle rack designed for the transportation of elongated articles, comprising for each of said joints:
    means for rigidly securing said joint to an associated one of said pair of rack bars;
    means for pivoting said wing from an open position to a closed position relative to said associated bar;
    a projecting abutment rigidly connected to said means for rigidly securing said joint to a rack bar, which abutment is configured and positioned to hinder said pivoting selectively and thereby hold said wing away from said associated bar with accessible space between said wing and said bar; and
    said pivoting means including a stop tab which is spaced from a projecting portion of said abutment when said wing is in said open position and which engages said projecting portion of said abutment and cooperates therewith to provide said hindering and holding upon pivoting of said wing from said open position to said closed position.

10. The pair of wing joints of claim 9 wherein said stop tab is positioned to engage an edge of a face of said abutment along which said tab rides when said wing is pivoted toward said closed position.

11. The pair of wing joints of claim 10 wherein said edge is shaped to facilitate said sliding.

12. The pair of wing joints of claim 9 further including spaced-apart bars connected to respective wing joints.

13. The pair of wing joints of claim 12 wherein said rack bars are rack cross bars, each of which has a center and there are two of said wing joints adjacent the center of each of said spaced-apart bars facing in opposite directions relative to the same.

14. The pair of wing joints of claim 9 further including a wing connected to each of said wing joints.

* * * * *